(12) United States Patent
Helal et al.

(10) Patent No.: US 7,895,257 B2
(45) Date of Patent: Feb. 22, 2011

(54) MODULAR PLATFORM ENABLING HETEROGENEOUS DEVICES, SENSORS AND ACTUATORS TO INTEGRATE AUTOMATICALLY INTO HETEROGENEOUS NETWORKS

(75) Inventors: Abdelsalam Helal, Gainesville, FL (US); Jeffrey Craig King, Gainesville, FL (US); Raja Bose, Gainesville, FL (US); Steven Lee Pickles, Wellington, FL (US); James A. Russo, Clermont, FL (US); Steve Vander Ploeg, Hillsboro, OR (US); Hicham Mahmoud El Zabadani, Gainesville, FL (US); Ahmad Hassan El Kouche, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 799 days.

(21) Appl. No.: 11/677,372

(22) Filed: Feb. 21, 2007

(65) Prior Publication Data

US 2007/0236346 A1    Oct. 11, 2007

Related U.S. Application Data

(60) Provisional application No. 60/775,372, filed on Feb. 21, 2006.

(51) Int. Cl.
*G06F 15/16* (2006.01)
(52) U.S. Cl. .................. 709/201; 718/100; 700/245
(58) Field of Classification Search .......... 709/220, 709/201; 718/100; 700/245
See application file for complete search history.

(56) References Cited

U.S. PATENT DOCUMENTS

| 6,553,336 | B1 | 4/2003 | Johnson et al. |
| 6,624,760 | B1 | 9/2003 | Kinzel et al. |
| 6,826,607 | B1 | 11/2004 | Gelvin et al. |
| 6,948,002 | B2 | 9/2005 | Chan et al. |
| 2002/0038307 | A1 | 3/2002 | Obradovic et al. |
| 2002/0136214 | A1 | 9/2002 | Do et al. |

(Continued)

OTHER PUBLICATIONS

Balazinska, M. et al., "INS/Twine: A Scalable Peer-to-Peer Architecture for Intentional Resource Discovery" *Lecture Notes in Computer Science, Pervasive Computing: First International Conference, Pervasive* 2002, Zurich, Switzerland, Aug. 26-28, 2002, vol. 2414, Springer Berlin/Heidelberg. Abstract Only.

(Continued)

*Primary Examiner*—Tammy T Nguyen
(74) *Attorney, Agent, or Firm*—Saliwanchik Lloyd & Eisenschenk

(57) ABSTRACT

A system includes a hardware platform, at least one driver, a plurality of devices connected to the hardware platform, a middleware interface, and a plurality of software services. Each of the plurality of devices is selected from the group consisting of sensors and actuators. The plurality of software services is generated by the at least one driver, wherein a software service associates with a device, and wherein each of the software services complies with the middleware interface. A method for interfacing a plurality of devices to a hardware platform includes communicably connecting each of the plurality of devices to the hardware platform, converting each of the plurality of devices into a programmable software service using a driver, and programming each of the software services to comply with a middleware interface.

40 Claims, 9 Drawing Sheets

U.S. PATENT DOCUMENTS

| | | | |
|---|---|---|---|
| 2003/0014521 | A1 | 1/2003 | Elson et al. |
| 2003/0114959 | A1* | 6/2003 | Sakamoto et al. ............ 700/245 |
| 2003/0200299 | A1 | 10/2003 | Jamison |
| 2004/0103139 | A1 | 5/2004 | Hubbard et al. |
| 2005/0149363 | A1 | 7/2005 | Loiterman et al. |
| 2005/0188111 | A1 | 8/2005 | Armstrong et al. |
| 2006/0085852 | A1* | 4/2006 | Sima ............................ 726/22 |
| 2006/0200542 | A1 | 9/2006 | Wilson |
| 2007/0011676 | A1* | 1/2007 | Sahita et al. ................. 718/100 |

OTHER PUBLICATIONS

Bonnet, P. et al., "Towards Sensor Database Systems" *Lecture Notes in Computer Science*, Cornell University, 2001, pp. 3, vol. 1987/2001.

Elson, J. et al., "Time Synchronization for Wireless Sensor Networks" *Proceedings of the 2001 International Parallel and Distributed Processing Symposium*, 2001, pp. 1-6.

Hammad, M.A. et al., "Stream Window Join: Tracking Moving Objects in Sensor-Network Databases" *Proceedings of the 15th International Conference on Scientific and Statistical Database Management*, IEEE, 2003, from http://ieeexplore.ieee.org.

Helal, S., et al., "The Gator Tech Smart House: A Programmable Pervasive Space" *Computer*, Mar. 2005, pp. 50-60, vol. 38, No. 3.

Howard, A. et al., "Mobile Sensor Network Deployment using Potential Fields: A Distributed, Scalable Solution to the Area Coverage Problem" *Proceedings of the 6th International Symposium on Distributed Autonomous Robotics Systems (DARS02)* Fukuoka, Japan, Jun. 25-27, 2002.

Kotz, D. et al., "The mistaken axioms of wireless-network research" *Dartmouth College Computer Science Technical Report*, Jul. 18, 2003, TR2003-467, pp. 1-14.

Sachenko, A. et al., "Sensor Errors Prediction Using Neural Networks" *IEEE-INNS-ENNS International Joint Conference on Neural Networks (IJCNN'00)*, 2000, pp. 4441, vol. 4, pp. 441-446. Abstract Only.

Yarvis, M.D. et al., "Real-World Experiences with an Interactive Ad Hoc Sensor Network" *Proceedings of the International Conference on Parallel Processing Workshops*, IEEE, 2002, from http://ieeexplore.ieee.org.

Ali, M.H. et al. "NILE-PDT: A Phenomenon Detection and Tracking Framework for Data Stream Management Systems" *Proceedings of the 31st VLDB Conference*, Trondheim, Norway 2005.

Wilson, A. "Gator Innovators Create Smarter Smart Space Technology" *University of Florida Engineering Publications*, Sep. 28, 2005.

"Network Operations Platforms: A New Segment in an Expanded Wireless Sensor & Control Network Market Category" *Tendril* http://www.m2mpremier.com/uploadFiles/TendrilWPMarketOrientated.pdf.

Enwall, Tim, "Understanding wireless sensor and control networks", *RFDesign*, Jan. 2006, pp. 6-11.

Enwall, Tim, et al., "Building Large-Scale ZigBee Systems with Web Services", *Sensors*, May 1, 2005.

* cited by examiner

MODULAR PLATFORM ENABLING HETEROGENEOUS DEVICES, SENSORS AND ACTUATORS TO INTEGRATE AUTOMATICALLY INTO HETEROGENEOUS NETWORKS

CROSS REFERENCE TO RELATED APPLICATION

The present application claims the benefit of U.S. Provisional Application Ser. No. 60/775,372, filed Feb. 21, 2006, the disclosure of which is incorporated herein by reference in its entirety.

The subject invention was made with government support under a research project supported by a Department of Education Grant No. H133E010106.

BACKGROUND OF THE INVENTION

Home automation systems, or smart homes, offer a wide variety of functions. Some include remotely controllable appliances, such as lights, doors, coffee machines, temperature controls, home theatre systems, communication systems, security cameras, surveillance equipment, and the like. Controlled appliances typically either include integrated circuitry through which operative states can be controlled, or are coupled to control modules, such as an X10 (™) module from X10 Wireless Technology, Inc. of Seattle, Wash. Often, controlled appliances can be manipulated using remote control units and/or control panels. Further, controlled appliances can be centrally controlled by a computer executing appliance automation software. For example, a smart home can provide automatic timed control of lights and appliances. Additionally, a smart home can allow a homeowner to remotely monitor and/or control household devices, such as doors, windows, thermostats, consumer electronics, or the like. Smart home products can also provide a range of intelligent security functions.

Given the convenience of controlling one's home from a central location, and the enhanced security features, smart home technology is ideally suited for individuals who suffer from diminished mental capacities or are physically challenged. For example, individuals experiencing fading sensory and cognitive skills, such as the elderly commonly forget to close a door or window or turn off an appliance. Further, an elderly person may desire the ability to open a curtain to let in light upon waking without having to rise from bed, or conversely, to close the curtain at bedtime. Moreover, automatic notification of emergency events, such as a water leak, allows an elderly person to seek help upon detection, reducing the probability of severe damage or injury.

Individuals suffering from physical or mental challenges, such as elderly persons, commonly require a caregiver to provide assistance with daily activities. However, in cases where the elderly person is high functioning and desires to maximize independence, a fulltime, onsite caregiver can be unnecessary, costly, and/or intrusive. Thus, the elder may prefer a remote caregiver who can assist the elder only when the elder asks for, or requires, help.

Conventional methods of providing remote care typically employ the use of portable communication devices. However, typical portable communication devices, such as pagers and cell phones, are limited. For example, in the case of a paging device, the elder must wait for a call back from the caregiver. Similarly, in the case of a cell phone, the caregiver may be out of range or unavailable, requiring the elder to leave a message and wait until the caregiver responds.

A further shortcoming of conventional remote care is the inability of the caregiver to make an immediate visual assessment of the elder's condition. For instance, in order to determine the elder's condition upon receiving a request for help, the caregiver must typically converse with the elder telephonically, which can be problematic if the elder is unable to speak or physically get to a phone. Further, the caregiver often must physically travel to the location of the elder to determine the nature of the help request, which can delay necessary treatment for the elder. The inability of the caregiver to have immediate knowledge of the elder's condition may result in the caregiver underestimating the gravity of the elder's condition. Conversely, the caregiver may overestimate the severity of the elder's condition, which may result in unnecessary and costly calls to emergency personnel, such as the fire department, ambulance, or the like.

Additionally, an elder may need a caregiver to unobtrusively check in on the elder from time to time. Optimally, the caregiver should be able to observe the elder without causing a disruption in the elder's day. However, conventional human surveillance mechanisms have many shortcomings. For example, typical remote viewing mechanisms, such as a monitor or dedicated display screen, are not portable and are operable only at a fixed location.

Most first-generation pervasive space prototypes in existence now are the result of massive ad-hoc system integration. Introducing a new device to the environment is a laborious process. After the initial decision on which particular component to purchase, the smart space developers must research the device's characteristics and operation, determining how to configure it and interface with it. The device must then somehow be connected and physically integrated into the space. Any applications using the new device must be written with knowledge of the resources assigned to connect the device, signals to query and control the device, and the meaning of any signals returned. Finally, tedious and repeated testing is required to guard against errors or indeterminate behavior that could occur if, for example, applications make conflicting requests of devices, or if devices or connection resources themselves conflict. Any change in deployed devices or applications requires repeating the process. This is the problem with conventional integrated pervasive spaces.

Pervasive computing environments such as smart spaces require a mechanism to integrate, manage and use numerous and heterogeneous sensors and actuators. There has been a dramatic increase during recent years in the number of sensor platforms in development or commercially available. One of these has been the Mote family, developed by the University of California at Berkeley as part of the SMART DUST™ project. Motes such as the MICA™, MICA2™, and MICA2DOT™ are available commercially from Crossbow Technology, Inc., San Jose, Calif. Some versions of the platform, such as MICA2™, offer limited modularity in the form of daughter cards, containing different sensor arrays, which can be plugged into the platform. Other versions lack this modularity. For example, TELOWS™, as developed by the SMART DUST™ team, is a completely integrated platform based on the TI MSP430™ microcontroller. (J. Polastre, R. Szewczyk, and D. Culler, "Telow: Enabling ultra-low power wireless research," in Proceedings of the 4th Intl. Conf. on Information Processing in Sensor Networks, April, 2005.) It offers higher performance and consumes less power than other Mote platforms, but comes at a higher cost, and the available sensors are integrated into the device and cannot be changed by users.

Motes are currently the de facto standard platform for sensor networks. Although the Mote was primarily developed for use in wireless ad-hoc networks for applications such as remote monitoring, researchers in many unrelated areas have used Mote primarily because of its commercial availability and its ability to integrate numerous sensors into a system. Many groups are working with Motes either as the basis for other projects or to further the sensor platform itself. For example, Intel and Berkeley have worked together on iMOTE™, a high-power Bluetooth-enabled version of the wireless sensor node. (L. Nachman, R. Kling, J. Huang and V. Hummel, "The Intel mote platform: a Bluetooth-based sensor network for industrial monitoring," in Proceedings of the 4th Intl. Conf. on Information Processing in Sensor Networks, April, 2005.) An another example, College of the Atlantic collaborated with Berkeley to use wireless sensor networks for habitat monitoring on Great Duck Island. (A. Mainwaring, J. Polastre, R. Szewczyk, D. Culler and J. Anderson, "Wireless sensor networks for habitat monitoring," in Proceedings of 1st ACM Intl. Workshop on Wireless Sensor Networks and Applications, pp. 88-97, September 2002.)

PHIDGETS™, developed by the University of Calgary, is another widely used, commercially available platform. (S. Greenberg and C. Fitchett, "Phidgets: easy development of physical interfaces through physical widgets," in Proceedings of 14th ACM Syep. on User Interface Software and Technology, pp. 209-218, November 2001.) The PHIDGETS™ support a large variety of sensors and actuators. However, they are not fully modular, and they only support communication to a Windows desktop computer via USB, which leads to scalability problems.

Some groups have worked on creating a more modular sensor network platform. The CUBE™, developed by University College Cork, (B. O'Flynn et al., "The development of a novel miniaturized modular platform for wireless sensor networks," in Proceedings of the 4th Intl. Conf. on Information Processing in Sensor Networks, April, 2005.) and MASS™ a Sandia National Laboratory project, (N. Edmonds, D. Stark and J. Davis, "MASS: modular architecture for sensor systems." in Proceedings of the 4th Intl. Conf. on Information Processing in Sensor Networks, April, 2005.) have modular architectures allowing users to develop applications and reconfigure platforms. However, the CUBE™ platform, for example, must be hardcoded to each device. Other sensor network platforms, such as NIMS™ (R. Pon et al., "Networked infomechanical systems: a mobile embedded networked sensor platform," in Proceedings of the 4th Intl. Conf. on Information Processing in Sensor Networks, April, 2005.), XYZ™ (D. Lymberopoulos and A. Savvides, "XYZ: a motion-enabled power aware sensor node platform for distributed sensor network applications," in Proceedings of the 4th Intl. Conf. on Information Processing in Sensor Networks, April, 2005.), and ECO™ (C. Park, J. Liu and P. Chou, "Eco: an ultra-compact low-power wireless sensor node for real-time motion monitoring." in Proceedings of the 4th Intl. Conf on Information Processing in Sensor Networks, April, 2005.) were designed for specific applications: environmental monitoring (NIMS™, XYZ™) and health monitoring (ECO™).

The SMART-ITS™, developed jointly by Lancaster University and the University of Karlsruhe, offer some features that could facilitate the development of pervasive spaces. (H. Gellerson, G. Kortuem, A. Schmidt and M. Beigl, "Physical prototyping with Smart-Its," *IEEE Pervasive Computing*, vol. 3, no. 3, pp. 74-82, July-September 2004.) They have a somewhat modular hardware design and a template-based software design process, which allows rapid application development. But the SMART-ITS™ platform is still not completely modular, with an integrated processing and communication board. Furthermore, devices connected through SMART-ITS™ are constrained to a single application (running on the SMART-ITS™ hardware). This does not allow for service-rich environments in which applications can be developed using service composition.

None of the available sensor network platforms are fully adequate for the scalable development of pervasive spaces. Most of the platforms focus only on sensors, and barely touch upon the issue of actuators. In a pervasive space, actuators play as important a role as sensors, as actuators are used to influence the space. NIMS™ and XYZ™ make use of actuators, but only for the specific purpose of making the platforms mobile. PHIDGETS™ support a large number of actuators, but are constrained by scalability issues and a fixed hardware configuration.

Additionally, none of these platforms have the capability to represent automatically their connected devices as software services to programmers and users. Instead, programmers must write distributed applications that query hard-coded resources to access the devices connected to the platform. Except for the larger number of devices supported, this is no better than connecting sensors and actuators directly to the input/output (I/O) ports of a computer. It is a development method that does not scale as more devices and services are added to a smart space.

Thus, there remains a need for a modular, service-oriented sensor and actuator platform specifically designed to support the development of scalable pervasive computing spaces.

BRIEF SUMMARY

A system includes a hardware platform, at least one driver, a plurality of devices connected to the hardware platform, a middleware interface, and a plurality of software services. Each of the plurality of devices is selected from the group consisting of sensors and actuators. The plurality of software services is generated by the at least one driver, wherein a software service associates with a device and wherein each of the software services complies with the middleware interface. A method for interfacing a plurality of devices to a hardware platform includes communicably connecting each of the plurality of devices to the hardware platform, converting each of the plurality of devices into a programmable software service using a driver, and programming each of the software services to comply with a middleware interface.

Figure 1:
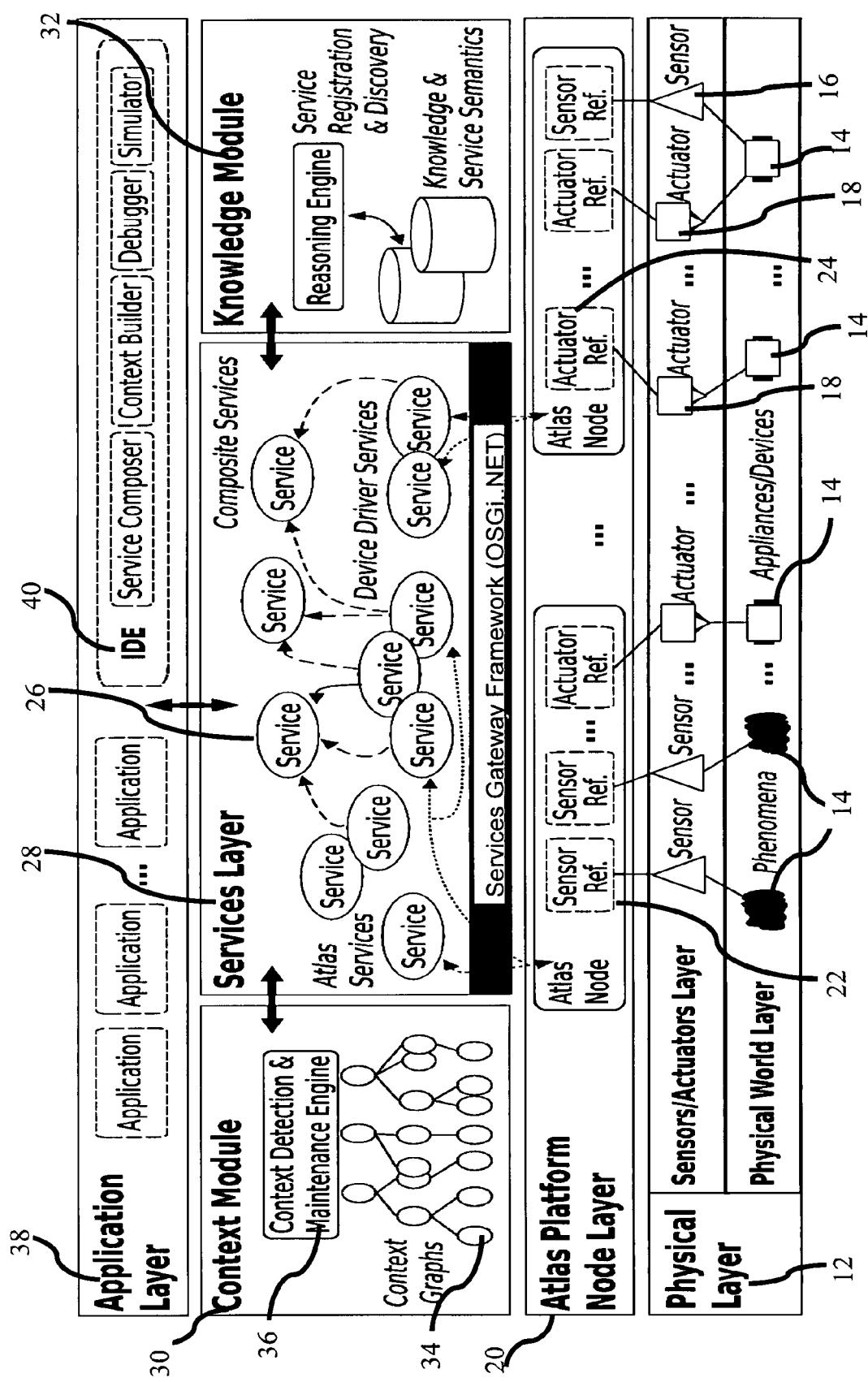
FIG. 1 is a schematic view of one embodiment of a middleware architecture for "programmable pervasive spaces," which are spaces built using the disclosed platform.

While the above-identified drawing figures set forth several exemplary embodiments of the disclosure, other embodiments are also contemplated. This disclosure presents illustrative embodiments of the present disclosure by way of representation and not limitation. Numerous other modifications and embodiments can be devised by those skilled in the art which fall within the scope and spirit of the principles of the present disclosure. The drawing figures are not drawn to scale.

DETAILED DISCLOSURE

Development of smart spaces is very different in goals and requirements from the typical sensor network application. Specifically, the manual integration of sensors and actuators is preferably replaced by a scalable, plug-and-play mechanism. Additionally, the smart space is preferably assembled programmatically by software developers instead of hard-wired by engineers and system integrators. This allows for cost-effective development, enables extensibility, and simplifies change management. The present disclosure relates to a service-oriented sensor and actuator platform that enables the concepts of self-integrative, programmable pervasive spaces. In the present disclosure, a pervasive space exists as both a runtime environment and a software library.

The present disclosure relates to embodiments of a universal platform that can provide a uniform interface to any type of sensor, actuator, or connected device. The universal platform can include both hardware and software. In one embodiment, a platform converts one or more sensors or actuators into one or more software services that can be programmed or composed into other services. In a specific embodiment, the platform architecture includes a processing module for processing the firmware and other programs that send data between a sensor or actuator and the platform, a communications module for transmitting data to a surrogate platform, and an interface module for connecting sensors, actuators, and other devices. In a further embodiment, the platform architecture includes a power module for the processing and/or communication modules. In further embodiments, the platform architecture includes additional processing modules for increased computation capabilities and/or other expansion modules.

Advantages provided by embodiments of the present disclosure include allowing the interchangeability of various sensors and actuators without the need for cumbersome reworking of the platform and/or associated software and the enabling of users of the platform to control, and interact with the sensors and actuators in a higher level language, without the need to program at the hardware level of the devices. Another advantage lies in the interchangeability of the hardware modules. For example, one communication module can be interchanged with another to allow for the use of one networking technology or another, without requiring the reworking of the other modules.

The present disclosure discusses models, methodologies, and processes for creating programmable pervasive spaces. In an exemplary embodiment, a smart space exists, in addition to its physical entity, as a runtime environment and a software library. Service discovery and gateway protocols and frameworks, such as Open Services Gateway Initiative (OSGi) or Microsoft .NET, for example, automatically integrate system components using a generic middleware that maintains a service definition for each sensor and actuator in the space. (D. Maples and P. Kliends, "The Open Services Gateway Initiative: An introductory overview," *IEEE Comm. Magazine*, vol. 39, no. 12, pp. 110-114, 2001.) Once powered on, the platform registers by sending its OSGi service bundle definition. Programmers assemble services into composite applications using various programming models, tools, and features of the middleware, which can be easily implemented or extended.

In one embodiment, programming an intelligent space involves three activities. First, context engineering involves interpreting sensory data. Second, software engineering includes describing various software component's behavior. Third, associating behavior with context includes defining which pieces of software can execute in a particular context and which pieces the system should invoke upon a contextual change.

The platform described in the present disclosure referred to as "Atlas," is the basic building block for programmable pervasive spaces. In an exemplary embodiment, the platform provides physical nodes for connecting various heterogeneous devices, a system for translating those devices into software services, a system for maintaining a library of device services and their interfaces and a runtime environment for accessing services and composing applications.

In one embodiment, the entities of a pervasive space include living beings and objects. The living beings interact with each other and with the objects. In a pervasive space the living beings are users, and the objects can be divided into two categories: passive objects and active objects. Passive objects are objects that cannot be queried or controlled by the smart space. At best, passive objects may be recognized by the space, but only users can manipulate them. Passive objects therefore are not key entities in a smart space. Active objects, however, can provide information to, or be manipulated by, the smart space. Active objects are key entities.

Active objects are further divided into two classes: sensors and actuators. Sensors provide information about a particular domain, supplying data to the system about the current state of the space. Sensors only provide measurement; they cannot directly alter the state of the space. Actuators are the active objects that alter the space. They activate devices that perform certain functions. Sensors and actuators are the foundations of a pervasive space, as they provide the means for gathering information about the state of the space and for controlling devices that can modify the state of the space. In one embodiment, the platform connects numerous and heterogeneous sensors and actuators to the services and applications that monitor and control the space.

For example, active objects nay include and are not limited to the following: a smart mailbox that senses mail arrival and notifies the occupant; a smart front door that includes a radio frequency identification (RFID) tag for keyless entry by residents and authorized personnel, including, for example, a microphone, camera, text LCD, automatic door opener, electric latch, or speakers; a garage with a driving simulator that evaluates elderly driving abilities and gathers data; smart window coverings such as blinds that be can preset or adjusted to control light and privacy; a smart bed that monitors and tracks sleep patterns; a smart closet that makes clothing suggestions based on weather conditions: a smart laundry that works with the smart closet to notify users when it is time to do laundry or helps to sort the laundry; a smart mirror that displays messages or reminders, such as those related to taking medication: a smart bathroom that includes a toilet paper sensor; a flush detector; a temperature-regulated, scald-resistant shower or bath or faucet; a soap dispenser that monitors user cleanliness and refill requirements; display devices that allow information to follow an occupant from room to room; a smart microwave oven that automatically adjusts for the particular food; a smart refrigerator or pantry that monitors food availability and consumption, detects expired items, creates shopping lists, and provides meal advice based on stored food items; a smart phone that allows for remote control of devices or conveys reminders to occupants in the space or users who are away from the space; smart thermostats that can personalize cooling and heating settings according to daily tasks or contexts; sensors for detecting water leaks; smart stoves that alert a user if left on and unused; smart projectors that display information on a wall currently faced by an occupant; a security system that alerts the occupant if windows or doors are open; and an emergency system that queries the resident if it suspects a problem and contacts help when necessary.

Connecting sensors and actuators to applications implies more than simply physically coupling these devices to a computer platform, although this is certainly important. In some applications, the space requires more devices than could be connected to the limited I/O ports for a single machine or even a small cluster. Connecting devices with applications means providing some mechanism for the applications to make use of devices and services directly. In one embodiment, the platform of the present disclosure is a network-enabled, service-oriented platform that automatically "converts" the various sensors and actuators to software services that are easily composed into composite services and applications. In this disclosure, such automatic conversion and service composition is referred to as "pervasive space programmability."

In an exemplary embodiment, a system of the present disclosure allows hardware platforms, connected devices, and associated software services to appear as a single, homogeneous environment even if actual the environment employs heterogeneous networks. Software on a server provides multiple, dynamic, and expandable modules to connect simultaneously with hardware platforms using various network technologies (e.g., wired Ethernet; wireless fidelity (WiFi), such as the 802.11 suite of wireless protocols; ZigBee™ and USB). In an exemplary embodiment, the system makes heterogeneous connections transparent to the software services, applications, users and programmers.

FIG. 1 shows one embodiment of a middleware architecture 10 for programmable pervasive spaces. The physical layer 12 consists of the various, phenomena, appliances, and devices in the space. The physical layer contains passive and active objects. The phenomena, devices and appliances of interest are active objects 14. Through sensors 16 and actuators 18, active objects 14 are captured into the smart space for observation and control.

The platform node layer 20 contains the sensor and actuator platform nodes 22 and 24, respectively, in the environment. These nodes 22, 24 automatically integrate the sensors 16 and actuators 18 (and hence their respective active objects 14) from the layer beneath and export their service representations to the layers above. The terms "above," "below," "beneath," "top," "bottom," "left," "right," "behind" and the like are used herein for simplicity of reference. They do not limit the disclosure in terms of orientation of the discussed elements. The platform layer 20 converts any sensor or actuator in the physical environment into a software service 26 that can be programmed or composed into other services. Programmers can thus define services 26 without having to understand the physical world.

The service layer 28, which resides above the platform layer 20, holds the registry of the software service 26 representation of the sensors 16 and actuators 18 connected to the platform nodes 20. In one embodiment, the service layer 28, which runs on a centralized server, also contains the service discovery, composition, and invocation mechanisms for applications to locate and make use of particular sensors 16 or actuators 18. In an exemplary embodiment, the service layer 28 contains a context management module 30 as well as a knowledge representation and storage module 32.

The knowledge module 32 contains an ontology of the various services 26 offered and the appliances and devices 14 connected to the system. This makes it possible to reason about services 26; for example, that the system should convert output from a Celsius temperature sensor to Fahrenheit before feeding it to another service. Service advertisement and discovery protocols use both service definitions and semantics to register or discover a service 26. The reasoning engine determines whether certain composite services are available.

The context management module 30 allows programmers to create and register contexts 34 of interest. In one embodiment, each context 34 is a graph implemented as an OSGi service wire API linking various sensors 16 together. A context 34 can define or restrict service activation for various applications; it can also specify states that a pervasive space cannot enter. The context engine 36 is responsible for detecting, and possibly recovery from, such states.

In an exemplary embodiment, the application layer 38 sits at the top and consists of an integrated development environment (IDE) 40 that provides access to a software library of sensor, actuator, and other services. It also contains the actual applications and composed services that monitor and control elements of the pervasive space. In the illustrated embodiment, the sensor and actuator platform covers the outlined layers in FIG. 1.

Figure 2:
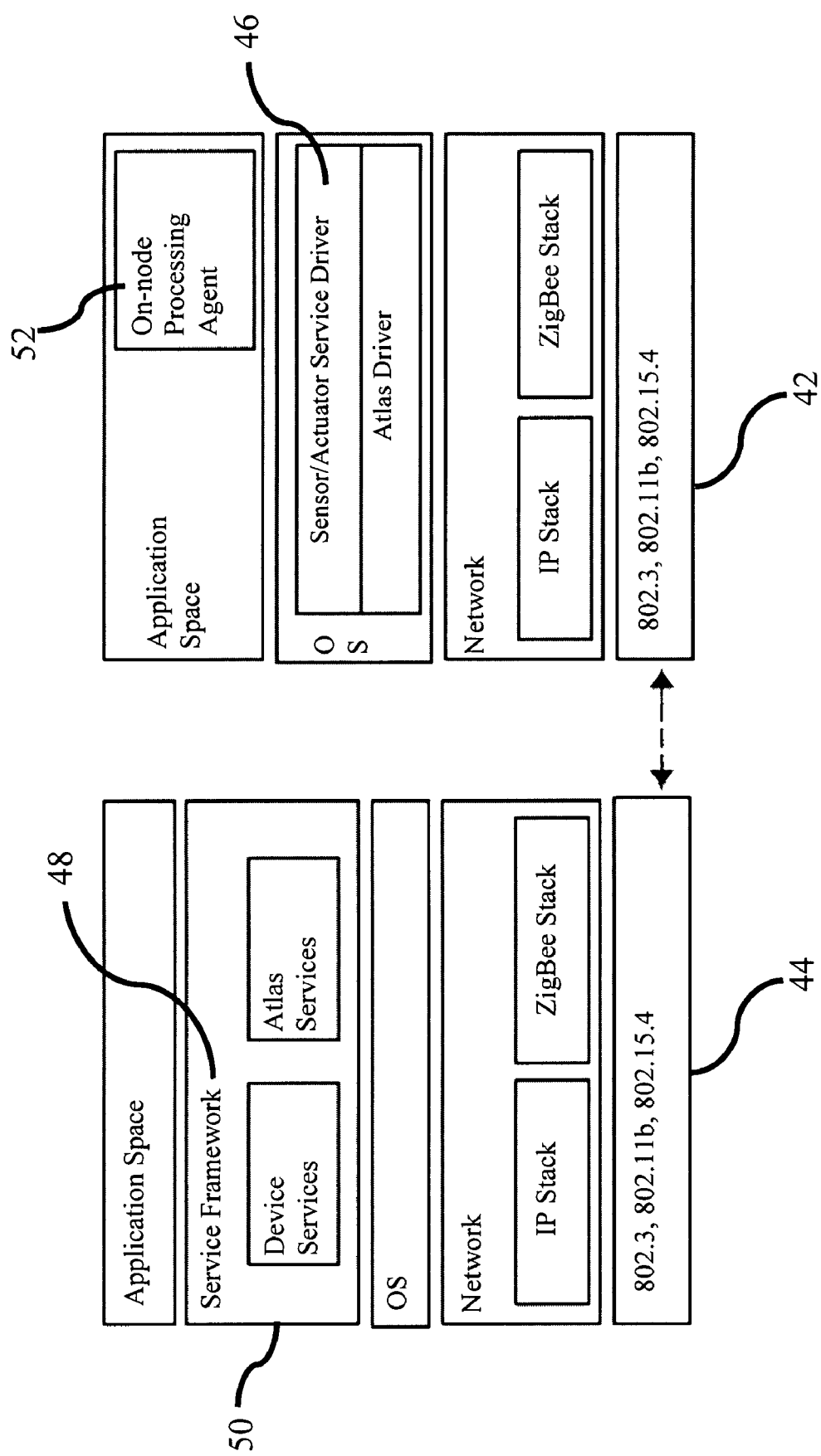
FIG. 2 shows one embodiment of a layered software architecture of the disclosed platform and an in-network server that hosts a service framework.

FIG. 2 shows one embodiment of a layered software platform node architecture 42 and an in-network middleware architecture 44 supporting the platform, including a server that hosts a service framework 48. In an exemplary embodiment, one or more drivers 46 is used as a template by a programmer to generate software services representing each associated device. In one embodiment, multiple software services can be generated from a single driver. In an exemplary embodiment, the system takes the driver 46 and annotates it with configuration information from the hardware platform, such as a unique platform identifier or an interface to which the associated device is connected, for example. This thus creates a unique software service that the server binds to the associated device.

In the illustrated embodiment, a driver 46 runs on the platform node 42. On power-up, the platform 42 transmits an associated sensor or actuator service driver 46 to the framework server 48 and establishes it as a device service 50. Optionally, a processing agent 52 is dynamically loaded onto the platform node 42 to allow for on-node processing (such as data filtering, data aggregation and query processing, for example). In other embodiments, a driver may be stored on an associated device (e.g., sensor or actuator), a media storage device (e.g., a compact disc with read-only memory (CD-ROM) or a digital versatile disc (DVD)) on a local repository or local network, or on a remote repository (e.g., a wide area network such as a point-to-point network or the internet).

In an exemplary embodiment, the platform is a combination of hardware, firmware running on the hardware, and a software middleware that provides services and an execution environment. Together these components allow virtually any kind of sensor, actuator, or other device to be integrated into a network of devices, all of which can be queried or controlled through a common interface, and facilitates the development of applications that use the devices.

In one embodiment, the platform represents any attached object in a pervasive space as a computer program. In an exemplary embodiment, that program is a Java program and the object is represented as a OSGi service bundle.

A. Hardware

Figure 3:
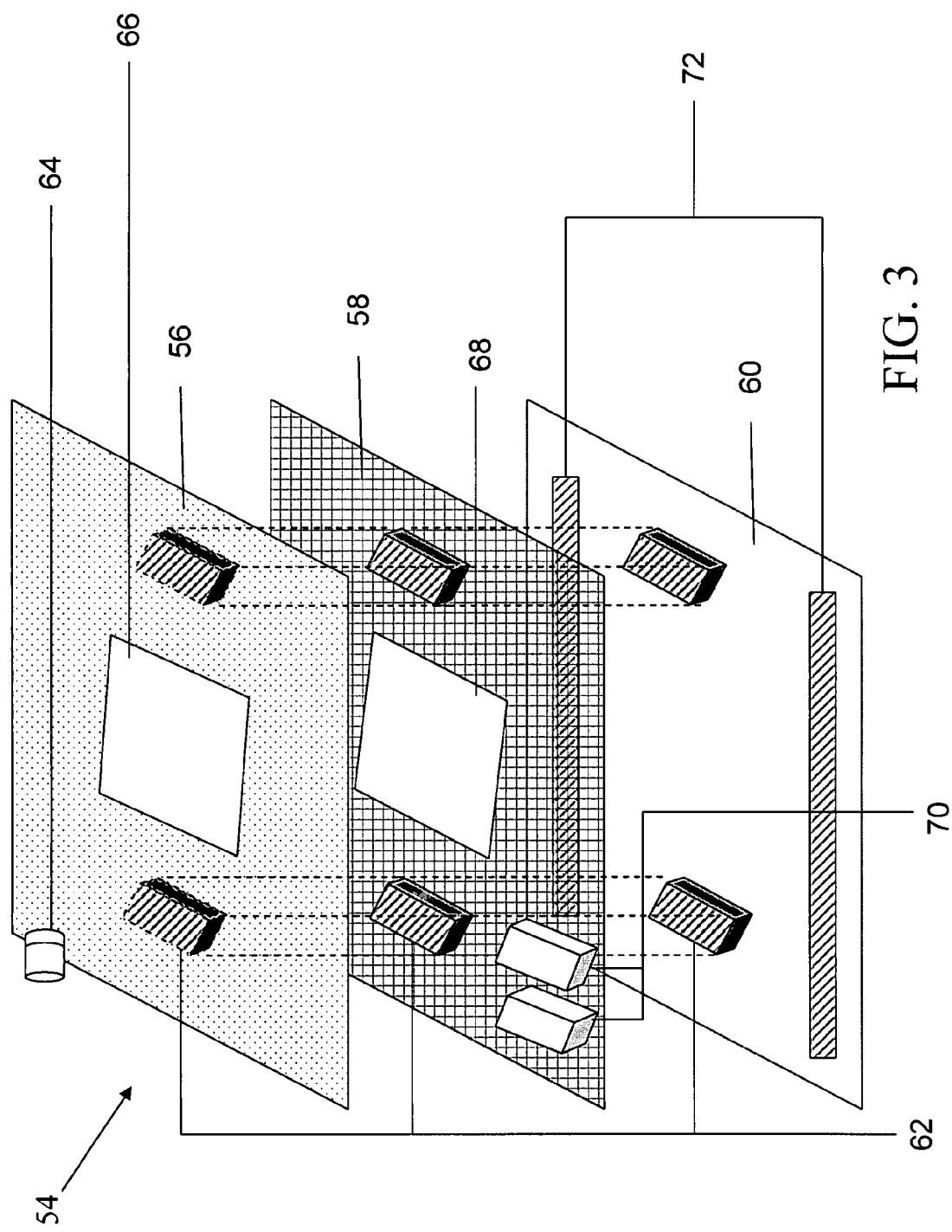
FIG. 3 is a perspective view of one embodiment of a platform node configuration consisting of a communication module, a processing module, and a connection interface module.

FIG. 3 is a perspective view of one embodiment of a hardware platform 54 configuration. In the illustrated embodiment, the platform node consists of three modules configured as board layers: the Communication Layer 56, the Processing Layer 58, and the Device Connection or Interface Layer 60. In an exemplary embodiment, each platform node is a modular hardware device 54 composed of stackable, swappable layers, with each layer providing specific functionality. In one embodiment, an approximately 2 inch×2 inch platform form factor uses DF17-series board-to-board connectors to communicably connect each device to the platform 54 and allow signals to be used on any layer. The modular design and easy, reliable quick-connect system allow users to change platform 54 configurations easily and quickly as needed. In one embodiment, the layered boards comprise a stack, and board may be added to or removed from the stack as required.

In the illustrated embodiment, the board layers are connected by universal connector buses 62. In an exemplary embodiment, communication layer 56 includes antenna connector 64 for wireless communication and communication module 66. In an exemplary embodiment, processing layer 58 includes microprocessor 68 and power jacks 70. In one embodiment, power jacks 70 are provided for AC and/or battery power. In another embodiment, secondary power jacks 70 can be used for daisy chaining multiple nodes. In an exemplary embodiment, device connection/interface layer 60 includes device connectors 72.

1) Processing Layer

The processing layer 58 is responsible for the main operation of the hardware platform node 54. In the illustrated embodiment, the design is based around the Atmel ATmega128L microprocessor 68. The ATmega128L is an 8 MHz chip that includes 128 KB Flash memory, 4 KB SRAM, 4 KB electrically erasable programmable read-only memory (EEPROM), and all 8-channel 10-bit A/D-converter. The microprocessor 68 can operate at a core voltage between 2.7 and 5.5V. In one embodiment, the processing layer 58 includes two RS232 ports, a Joint Test Action Group (IEEE 1149) an ISP port, and more than 50 programmable I/O pins. This chip possesses the desirable characteristics of low power consumption, ample SRAM and program space, and readily available tools and information resources. An exemplary embodiment of a processing layer 58 additionally includes a real-time clock for accurate timing. The clock can also be used to awaken the microprocessor 68 from a sleep state at specified intervals. In other embodiments, the processing layer 58 includes a processor or controller such as the Intel PXA255 microprocessor, the Texas Instruments OMAP or TI-MSP430 microprocessor, one of the PIC suite of processors, a custom processor, or a low-power processor, for example.

In an exemplary embodiment, the processing layer 58 stores both the firmware that integrates the hardware platform node 54 with the middleware framework and the device driver bundles that run in the framework. In an exemplary embodiment the processing layer 58 supports power operation ranging from ultra-low for long operation on battery power to full operation on wired power. The version of the processing layer shown in FIG. 3 also includes two plugs 70 for wired power, and this layer provides all 3.3V power via a low-dropout linear voltage regulator. The platform 54 can be powered by a single 3.3V or gi-eater power supply. The peak current consumption in active mode is 86 mA. In an exemplary embodiment, even though the main power for the platform 54 is 3.3V, it is possible to integrate sensors that require 5V or more by using an octal translator.

In one embodiment, a driver is surrogate software—Java byte code that contains information about a device such as a sensor and the services it provides—stored in an electrically erasable programmable read-only memory (EEPROM) on the platform node 54.

The second plug can be used to daisy-chain nodes together, reducing the number of outlets used in a smart house environment. The number of nodes that can be chained to a single power supply depends on the number and type of devices connected to the platforms 54. For example, in a SMART FLOOR™, discussed below, each node is connected to 32 pressure sensors and 15 platform nodes 54 can be daisy chained.

2) Communication Layer

Data transfer over the network is handled by the communication layer 56. In an exemplary embodiment, the communication layer 56 uses a Cirrus Logic Crystal LAN CS8900a network interface controller (NIC) IC and a standard RJ45 connector for basic 10 Base-T wired Ethernet networking. Light Emitting Diodes (LEDs) provide instant feedback as to power, connectivity, and LAN activity. In one embodiment, interfacing the CS8900a to the processing layer 58 is done in I/O mode; no memory mapping is required. One embodiment uses a simplified IPv4 stack.

Alternative embodiments include wireless communication layer options in addition to, or in place of, a wired Ethernet. In one embodiment, the communication layer 56 uses a universal serial bus (USB) connection. In another embodiment, the communication layer 56 is a BLUETOOTH™ communication layer based on the Blue Radios BR-C30 Bluetooth IC. In yet other embodiments, the communication layer 56 is configured to use ZIGBEE™ or 802.11b wireless communication. In another embodiment, the communication layer 56 is a powerline communication layer.

3) Device Connection Layer

The interface or connection layer 60 is used to connect the various sensors and actuators to the platform 54. Integrating any number of analog and digital sensors is possible. In an exemplary embodiment, the platform 54 is capable of connecting: up to 8 analog single-wire sensors; up to 8 analog three-wire sensors; and up to 32 analog three-wire sensors. In one embodiment, a connection layer 60 for analog sensors routes to the ATmega128L's 8-channel DC (on a port of the microprocessor 68 of the processing layer 58). In such an embodiment, connecting more than 8 sensors is accomplished by multiplexing the connections. Digital sensors may use custom connection layers.

IEEE 1451 defines a standard for sensor or actuator (or any transducer) connections including support for providing a transducer electronic data sheet (TEDS) at the connection level. (K. Lee, "IEEE 1451: a standard in support of smart transducer networking," 17th Instrumentation and Measurement Technology Conf., vol. 2, pp. 525-528, May 2000.) An exemplary embodiment of the platform 54 of the present disclosure supports this standard. One example of a suitable actuator is a simple current switch (with optional manual control).

Figure 4:
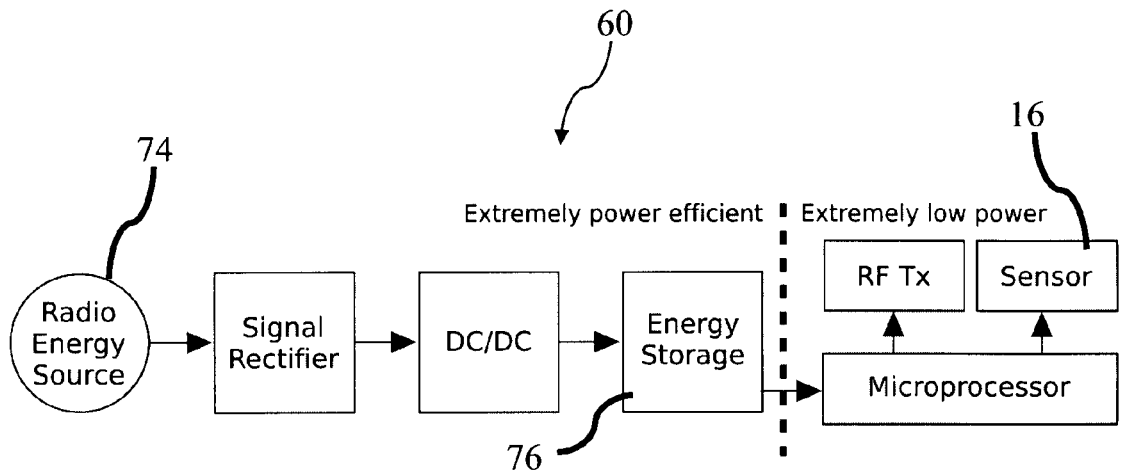
FIG. 4 shows the overall system design of the passive sensors in one embodiment of a wireless device connection layer.

In some applications, wiring devices to the device connection layer 60 may be cumbersome or impractical due to placement of the devices or the number of devices being connected to a platform node 54. A wireless device connection layer 60 eliminates the need for devices to be physically connected to the platform node. FIG. 4 shows the overall system design of the passive sensors in one embodiment of a wireless device connection layer 60. In an exemplary embodiment, a passively powered wireless connection layer 60 is designed for remotely connecting devices such as sensors 16 and actuators 18 to the platform 54. In one embodiment, the passively powered sensors 16 and actuators 18 are remotely charged and powered via a radio frequency energy source 74, provided by a radio frequency generator, which is transformed into a usable DC energy storage 76. This allows for battery-free sensors that can last years without requiring a battery charge or replacement.

Figure 5:
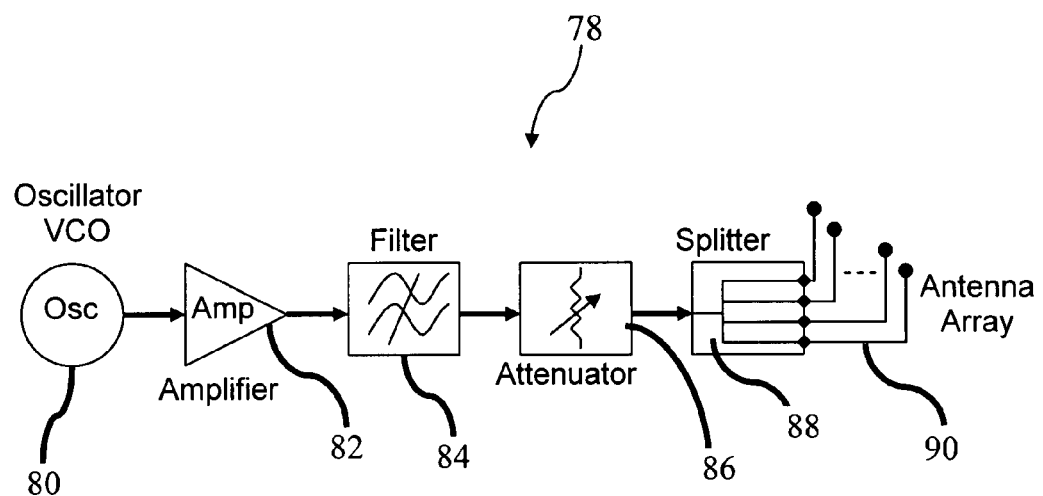
FIG. 5 shows an exemplary radio frequency generator.

FIG. 5 shows an exemplary radio frequency generator 78. In an exemplary embodiment, the radio frequency generator 78 is composed of a voltage controlled oscillator (VCO) 80, high power amplifier 82, high quality factor filter 84, attenuator 86, a splitter 88, and antenna arrays 90. The VCO 80 generates the high frequency signal, either 916 MHz or 2.45 GHz, which is amplitude modulated via the VCC power input pin. The high frequency source is amplified by the high power amplifier 82 to about +30 dBm signal. The signal is then split into multiple output sources via a signal splitter 88 and fed to a high directivity gain antenna 90 with an effective intrinsic radiated power of 4 Watts.

In one embodiment, a Remote Connection Layer connects to the various devices and a Local Connection Layer connects to a platform node. The Remote and Local Connection Layers communicate wirelessly, supporting the same detection and control mechanisms as the standard Device Connection Layer. Such an arrangement is especially suitable in closed environments, such as underneath a raised floor, behind walls, ceilings, sinks, bathtubs, cabinets, and other areas.

Figure 6:
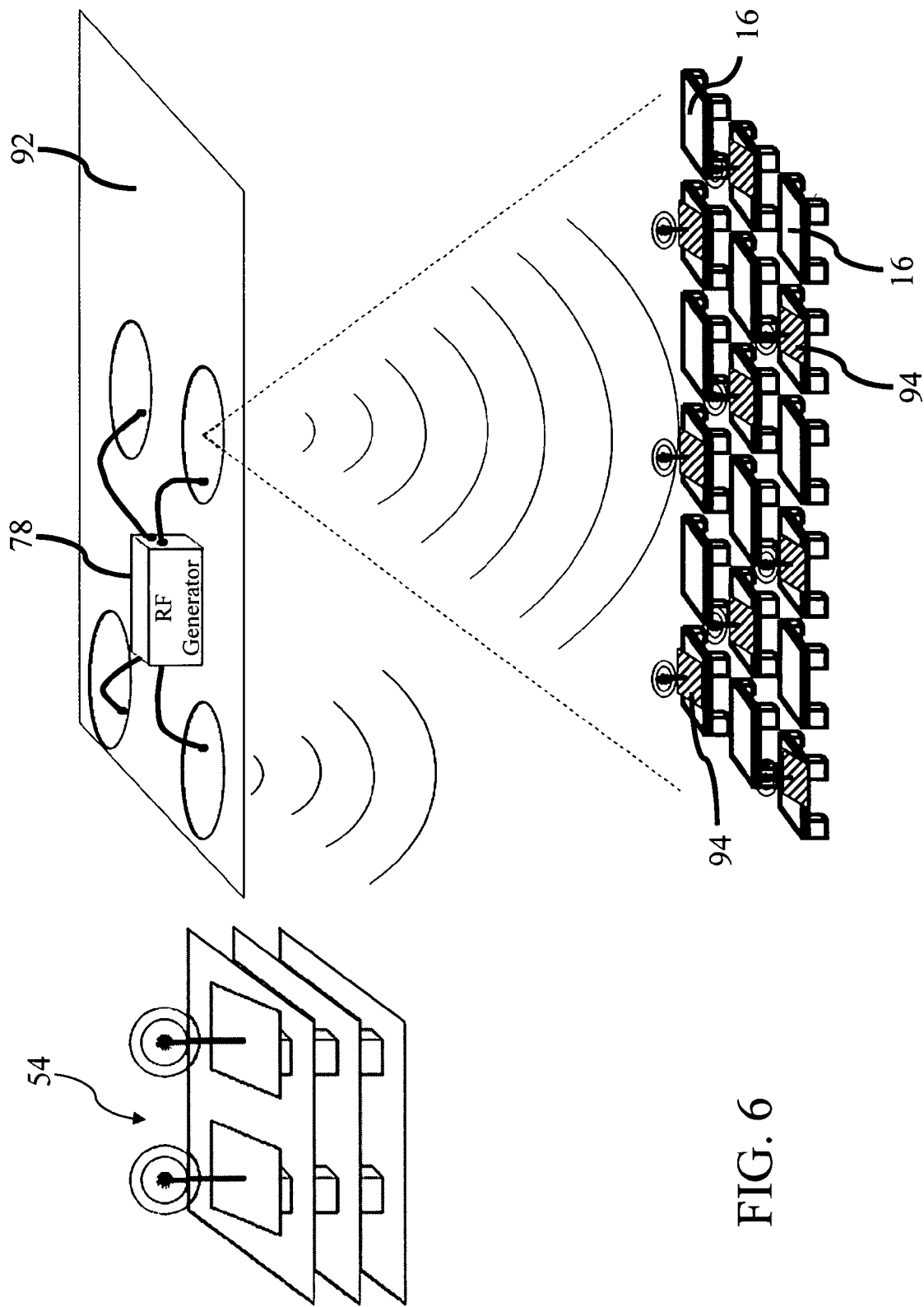
FIG. 6 is a perspective view of one application embodiment, where a platform node is using a Local Connection Layer to communicate wirelessly with multiple Remote Connection Layers each attached to a number of sensors.

The Remote Connection Layer and the devices connected to it may be passive, powered via traditional mechanisms such as batteries or power outlets, or may make use of power scavenging techniques, using resources such as solar or radio frequency power. FIG. 6 is a perspective view of one application embodiment, where a platform node 54 is using a Local Connection Layer 92 to communicate wirelessly with multiple Remote Connection Layers 94, each attached to a number of sensors 16. In this example, the Remote Connection Layers 94 are charged using power scavenging techniques by using radio frequency energy being broadcast by an RF generator 78 in the ceiling. In one embodiment, some devices are attached to a remote connection layer 92 by Smart Plugs.

4) Other Layers

The platform 54 of the present disclosure is not limited to three layers. Additional layers may be added to provide extra processing power, security features, multiple communication mediums, network switching, memory, or alternative power options, for example. One example of an additional layer is a combined Power and Communication Layer using the Power-over-Ethernet standard. In one embodiment, a memory module provides a mechanism for easily modifying an EEPROM store used for read and write capabilities on the platform node 54. This storage contains bootstrap data that specifies general sensor 16 and actuator 18 information. In one embodiment, when the platform 54 is powered up, its EEPROM data acts as a bootstrap mechanism that provides the larger system—for example, a network server or home PC—with the information and behavioral components required to interact with a specific device, appliance, sensor, or actuator. The data can be specified as higher human-readable (XML or text with a URL, for example) or machine-readable (for example, Java byte code), depending on the specific application. In addition to byte code, stored data includes device-specific information such as the manufacturer's name, product serial number, and sensor type.

The platform 54 of this disclosure is not limited to a layered design. In one embodiment, a specific platform configuration is referred to herein as a Smart Plug (further discussed with reference to FIG. 10), in which several layers are integrated tightly to achieve a small form factor. In the Smart Plug, a processing layer, a powerline communication layer and a RFID reader (as a physical sensor) are all integrated into a single board. In an exemplary embodiment, such tight integration does not alter the firmware or the software architecture of the disclosed platform.

In one embodiment, a platform of the present disclosure is mounted on a development and debugging board, which is used for configuration, programming and debugging the platform. In one example of such an embodiment, the development and debugging board uses RS232 ports for online debugging.

B. Firmware

In an exemplary embodiment, the firmware runs on the processing layer of the platform hardware and allows the various sensors, actuators, and the platform itself to automatically integrate into the middleware framework.

In one embodiment, the structure of the firmware is dictated by the choice of network stack. One example of a suitable network stack is an open-source µIP stack for IP networking developed by Adam Dunkels at the Swedish Institute of Computer Science. µIP is a platform-neutral ANSI C TCP/IP stack intended for embedded devices. It maintains its neutrality by containing a platform-independent core and providing a framework for users to write the device-(microprocessor and NIC) specific code necessary to operate their components. The framework also defines how to develop applications using µIP. In an exemplary embodiment, µIP itself is the main executable and begins to run when a node is turned on. The µIP framework, during its main execution loop, calls a function that executes the desired code, in one case, the firmware of the present disclosure. It takes approximately 2-3 seconds for a node of the present disclosure to start up, join the network, upload its services to the framework, and begin sending data and receiving commands.

In an exemplary embodiment, each platform node, and therefore each connected sensor, actuator, or other device, is directly connected to the internet through this internet protocol (IP). In another embodiment, the network stack is NUT-FLASHNET, developed by the Ethernet Open Source Hardware and Software Project and supported by Egnite Software GmbH. In yet other embodiments, the network interface supports ad-hoc networking protocols or mesh networking protocols, for example. In exemplary embodiments, a microprocessor drives a network interface controller either directly or through a Universal Asynchronous Receiver/Transmitter (UART) interface.

Figure 7:
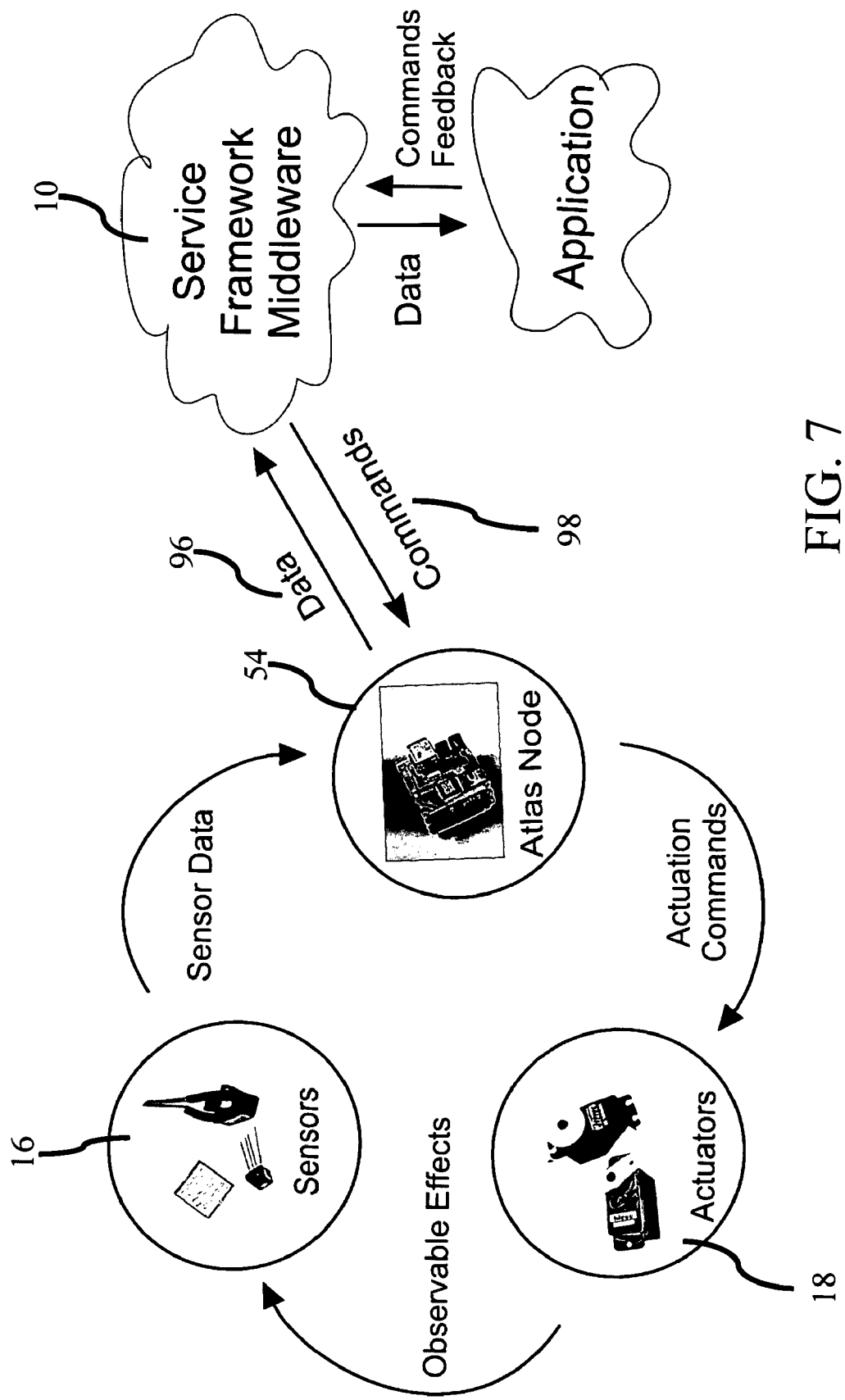
FIG. 7 is a diagram of information flow through nodes and middleware in one embodiment of the present disclosure.

FIG. 7 is a diagram of information flow through nodes 54 and middleware 10 in one embodiment of the present disclosure. In an exemplary embodiment, each node 54 of the present disclosure is given a unique identifier. When a node 54 comes online, it sends its identification or other data 96 to the middleware 10. When this is acknowledged, it sends the driver bundle 98 for the attached devices 16, 18. After this, the application function loops, handling any incoming network packets, periodically sampling the sensors 16, sending signals to actuators 18, transmitting sensor data, and sleeping. This process is shown in FIG. 7. In an exemplary embodiment, the platform 54 also performs data filtering functions. In an exemplary embodiment, the firmware is a modular, plug-and-play operating system for the platform nodes 54. In one embodiment, the firmware includes a bootloader that allows remote replacement of the operating system. A bootloader also allows nodes 54 to automatically detect the current hardware configuration (Communication Layer, Device Connection Layer, etc.) and accordingly update the firmware.

The platform 54 of the present disclosure allows for plug-and-play development of pervasive spaces, which makes it very easy to add new devices 16, 18 into the space. In an exemplary embodiment, the middleware server can be used as a central authority for the network.

C. Middleware

Figure 8:
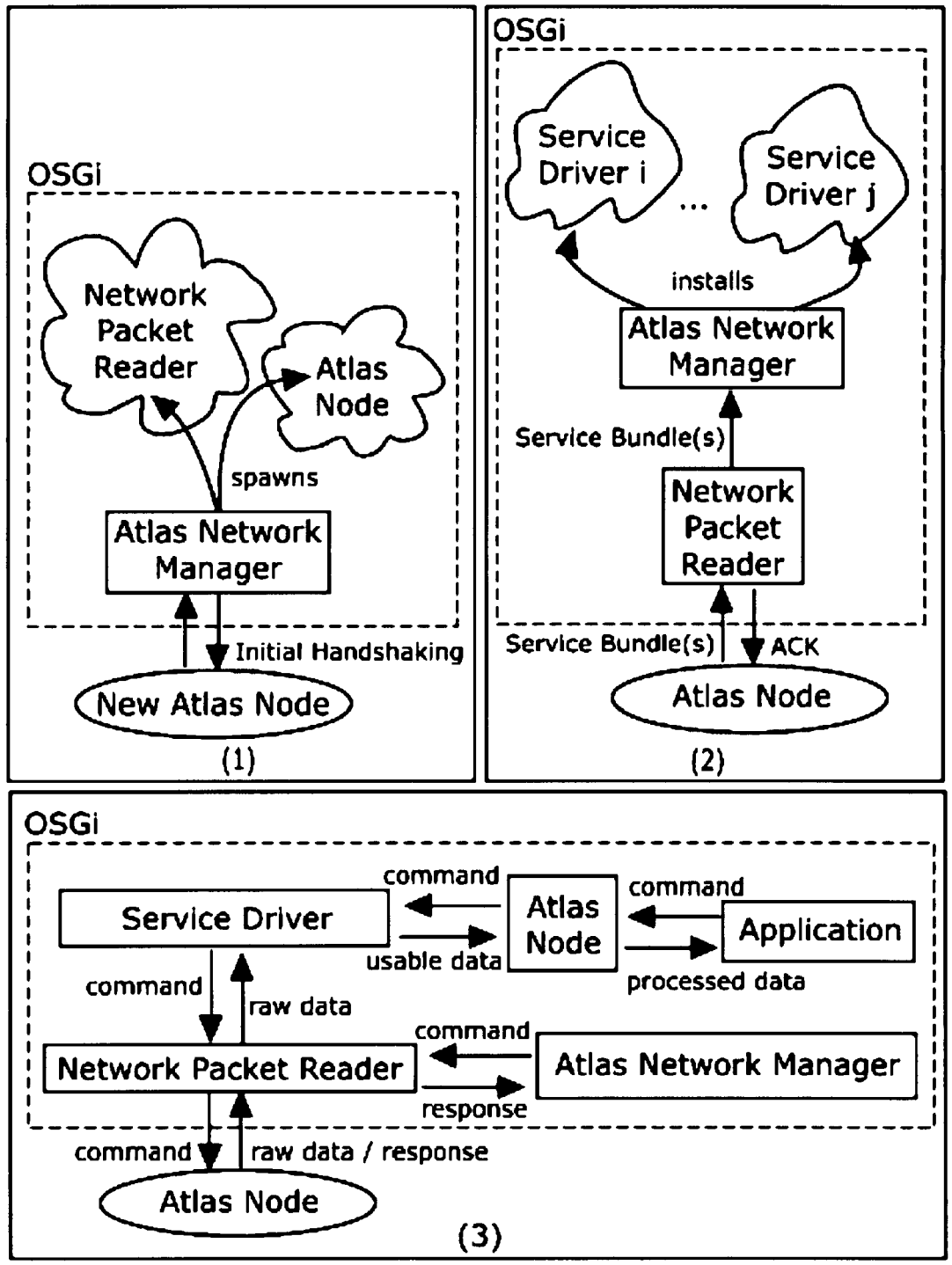
FIG. 8 is a diagram of a middleware framework in one embodiment of the present disclosure.

FIG. 8 is a diagram of a middleware framework in one embodiment of the present disclosure.

1) Services

In an exemplary embodiment, although the middleware does, in part, run on the platform nodes, the majority of the framework operates on a stand-alone server. Thus, the software services are registered and hosted in an industry-standard service framework. A particularly suitable service framework is based on the Open Services Gateway initiative (OSGi) standard specifications, governed by the OGSi Alliance. OSGi provides service discovery and configuration mechanisms for creating a programmable pervasive space. Another suitable service framework is the net environment developed by Microsoft Corporation.

In an exemplary embodiment, when a platform node comes online, it negotiates with the middleware to connect to the Atlas Network Manager (ANM) bundle running in the middleware, which is listening on a dedicated port.

As shown in FIG. 8(1), after the initial contact, the ANM spawns two new software services, a Network Packet Reader (NPR) and an Atlas Node (AN). Separating the NPR and AN services in the middleware allows a user to easily program a service to change either the communication protocol or the functioning of the Atlas platform without affecting the other.

Once the AN is registered in the middleware (i.e., it has been identified and the device driver bundle it hosts has been transmitted), the ANM starts the device driver as a new Sensor or Actuator Service Driver (SD), as shown in FIG. 8(2). This therefore creates in the middleware a unique SD service for each device attached to the Atlas node. The AN itself provides node-specific data processing that is too complex or expensive for the node's onboard microprocessor. Applications are then able to locate and use the services provided by the new devices (see FIG. 8(3)).

In an exemplary embodiment, a driver represents each of the hardware sensors, actuators, or other devices connected to the platform as a software service on a software interface, such as the middleware. These services are then made available to client programs or users through the middleware, such as by applications and other services. The interface hides the low-level hardware details of the devices in the network, allowing users to develop, extend or modify applications on a higher level. Thus, in an exemplary embodiment, each software service, regardless of the type of associated device, complies with a standard, uniform interface such as the middleware. The software services can be discovered and accessed through this interface by applications and other services using standard mechanisms, such as those provided by an industry-standard service framework.

Users and programmers are able to develop applications by composing software services using logic suitable for the particular application. In an exemplary embodiment, the system allows users to compose applications by utilizing connected devices via their associated software services. The system also allows users to compose applications that include high-level processes or computational structure (program, function, etc.) at a software level. In an exemplary embodiment, all three levels of the system (eg., server, hardware, and associated devices) have processing capabilities. Thus, processes can be delegated among the levels as desired. Moreover, processes can alter operation of the server, hardware platforms, or connected devices. Processes can also filter or otherwise alter data entering or leaving the server, hardware platforms, or connected devices. Processes can also encompass general-purpose computation.

In an exemplary embodiment, the system includes a mechanism to automatically decompose a process into sets of instructions that can run on the server, and sets of instructions that can be delegated to run on the hardware platforms. Then the server automatically pushes appropriate instructions to the appropriate hardware platforms. This allows for efficient and scalable computation (such as managing platforms and implementing data streams) that takes advantage of all hardware resources, without requiring users to develop distributed computing processes or know the details about the hardware platforms and connected devices used.

In an exemplary embodiment, users and programmers are able to develop and deploy multiple applications that share common hardware platforms, connected devices, and/or associated software services. In one embodiment, this is achieved when users and programmers use standard Integrated Development Environments (IDE) to develop applications utilizing the software series, hardware platforms and devices in a standardized way. Suitable IDE's include, for example, the Eclipse Development Environment developed by the Eclipse Foundation, Inc. and the .net development and run time environment developed by the Microsoft Corporation.

An exemplary method of using the platform includes monitoring a device, generating monitoring data for the device, and controlling the device using the monitoring data. In an exemplary embodiment, a driver for a device is transmitted to the platform middleware through the platform hardware. The drivers for devices may be stored directly on the platform hardware (a surrogate architecture) or on the sensor, actuator, or other device itself, which is read by the platform hardware and relayed to the middleware. In one embodiment, either the platform or a device connected to it contains a URL to the driver. This URL would be passed to the middleware, which would then download the driver from the internet. In another embodiment, the platform uploads the drivers of the devices connected to it to the middleware when the platform is turned on.

In an exemplary embodiment, a running platform also monitors for the connection of new devices or disconnection of existing devices. If a new device is connected, the platform will transmit the driver for that device. If an existing device is disconnected, the platform notifies the middleware that the device is no longer available.

In an exemplary embodiment, the system provides for local and/or remote configuration and management of the software, hardware platforms, and associated devices. For example, editing of software services may be performed locally or remotely. In exemplary embodiments, access is based on the internet, a graphical user interface (GUI), or a command-line interface.

In an exemplary embodiment, the system provides self-recovery mechanisms. Server and software services are able to automatically query the status of hardware platforms and connected devices. In an exemplary embodiment, the system is also able to automatically send control commands to hardware platforms and connected devices to alter operations based on status or other factors. In an exemplary embodiment, the system is able to also automatically create composition of software services. Composition allows errors in particular hardware platforms and devices to be detected and repaired or prevented from influencing other software services. This prolongs availability, increases reliability, and provides fault-tolerance and self-recovery.

Figure 9:
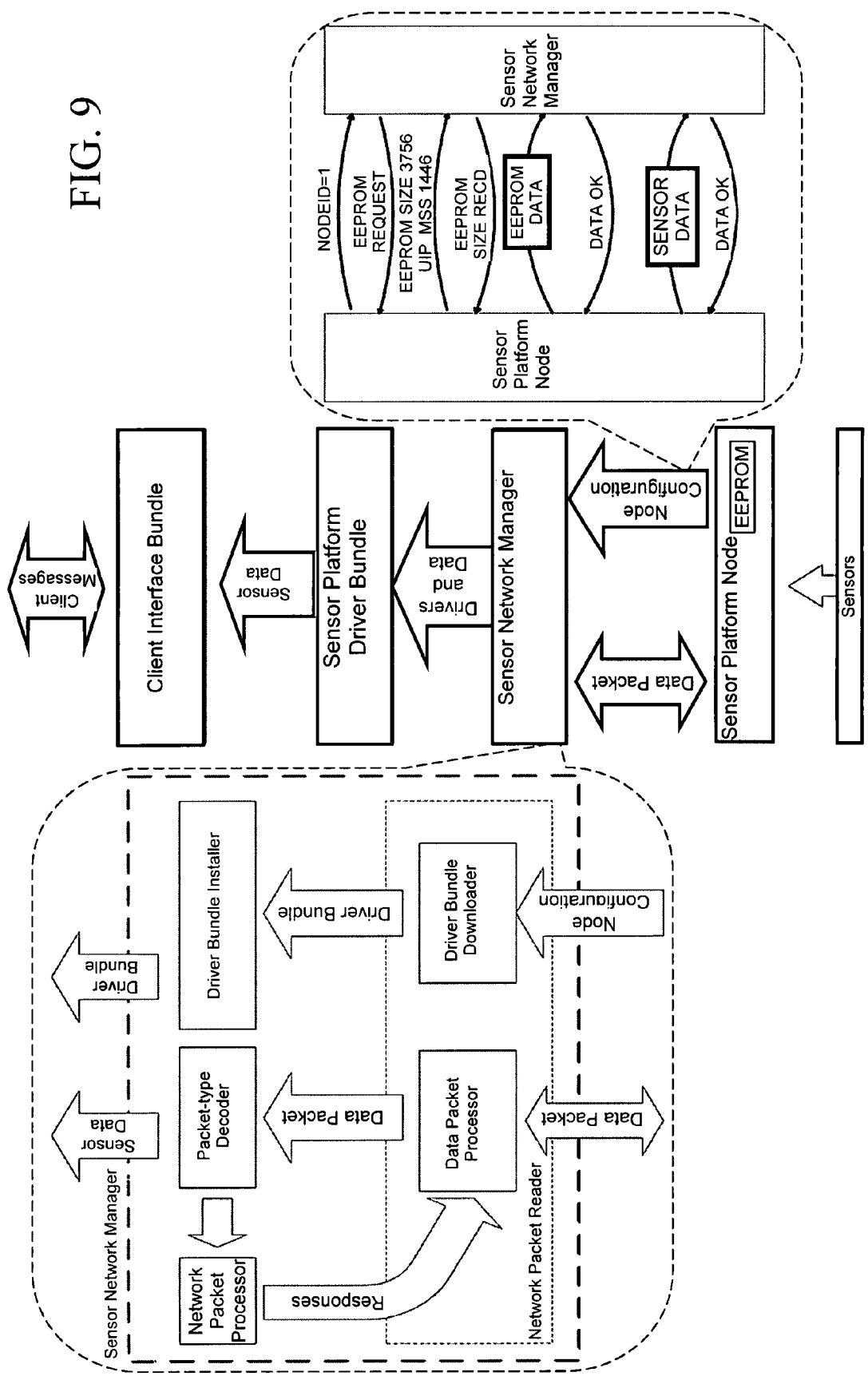
FIG. 9 is a diagram of a system architecture in one embodiment of the present disclosure.

FIG. 9 is a diagram of a system architecture in one embodiment of the present disclosure. Users of the network create programs that run in the middleware. These programs are called "clients." Each client encapsulates the functionality of a particular application, acts as a server or proxy to transmit data between the network and external services (programs running outside the middleware), or both. In an exemplary embodiment, the platform middleware has a client registration server which downloads and installs clients in a plug-and-play manner and automatically configures any network or interprocess communication facilities needed.

2) Execution Environment

In one embodiment, applications directly using a platform-based network are OSGi bundles implementing the Atlas Network Application interface. They listen for SD services using standard OSCi routines. OSGi also handles the appearance and disappearance of SD services and ensures that applications using those services do not crash or become unstable.

One embodiment of the middleware also includes functionality that allows users to download proxy applications (i.e., OSGi bundles that implement a proxy interface) into the framework. This system gives programmers developing applications that run outside the framework an easy way to make use of the various services running in the framework.

Additionally, a single pervasive space may cover many geographically dispersed areas. In one embodiment, the middleware is distributed to solve these issues. This architecture allows a hierarchical grouping of middleware servers, each of which can connect to platform nodes and other servers, feeding information to a parent server.

Moreover, in exemplary embodiments the operating system also handles functions such as security, privacy, data processing, and running user-defined programs.

D. Exemplary Applications

1) Smart Floor

In an exemplary application, a platform node of the present disclosure is mounted to an underside of a tile of a smart floor. In one embodiment, a smart floor is an indoor location-tracking system. An effective pervasive space desirably makes use of information about where its users are located as this positional knowledge can be used to increase the performance of many services in the space. One application of the platform node of the present disclosure is in a pressure-sensitive raised floor. In one embodiment, one pressure sensor under each block of the floor detects a step anywhere on that block (about 2 square feet of floor space). In one embodiment, the platform node of the present disclosure is used by first creating a sensor connection layer that interfaces with the existing sensors. Each node, when deployed, connects to 32 sensors and is programmed with the identity and location of each associated block. Since each sensor appears as a unique service in the middleware, and since the location information for each sensor is available from its service, the floor using the platform node of the present disclosure facilitates the mapping of the sensors to physical space. The data filtering capability of the platform node of the present disclosure allows nodes to transmit data only when pressure sensor readings change, preventing the smart floor information from flooding the network.

2) Smart Plug

Figure 10:
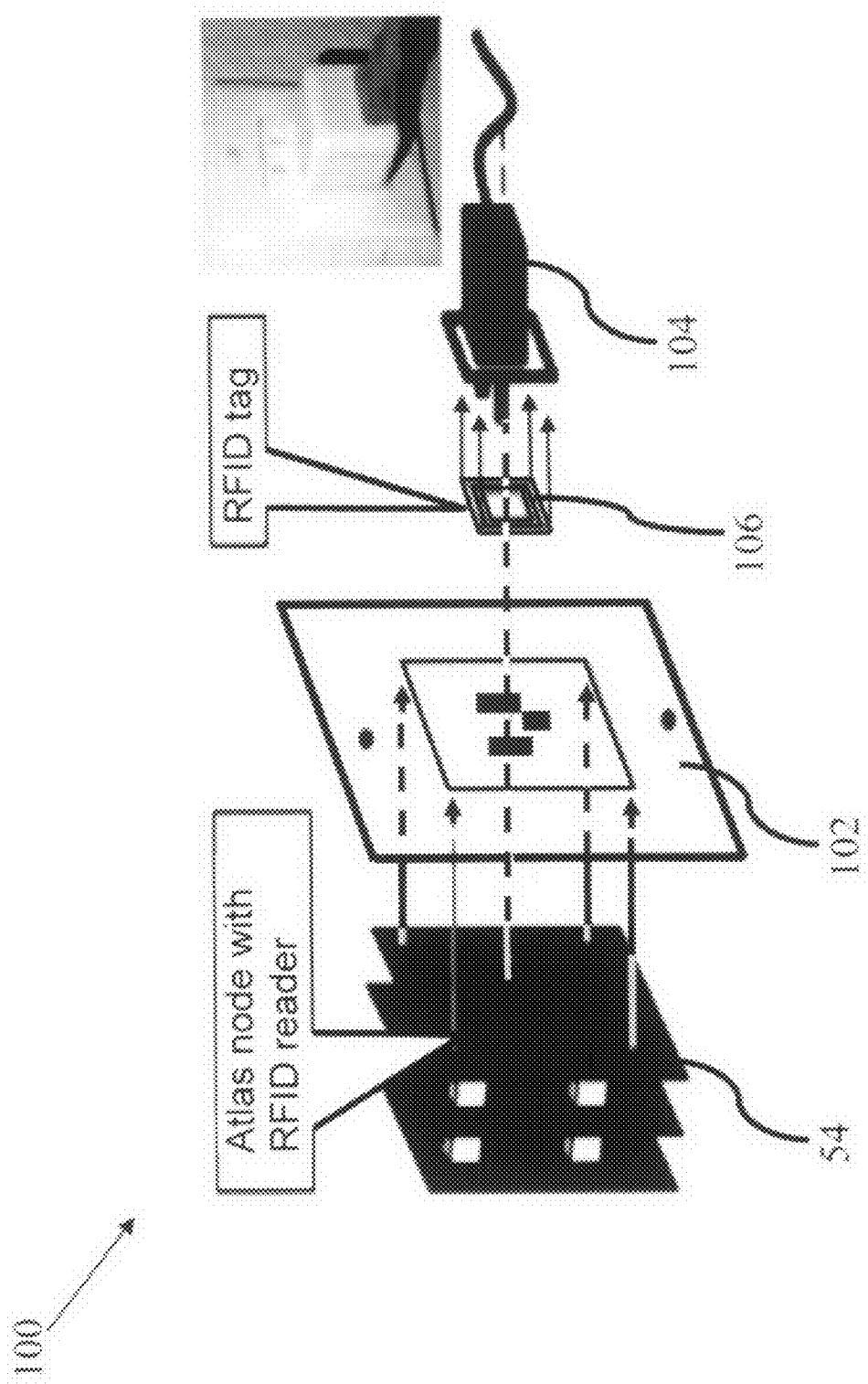
FIG. 10 is a perspective view of a smart plug utilizing one embodiment of a platform node of the present disclosure.

FIG. 10 is a perspective view of a smart plug using one embodiment of a platform node 54 of the present disclosure. In one embodiment, a smart plug 100 offers a controllable interface and allows a smart space, the space's resident, or remote or local caregivers to identify, locate, and control devices such as electrical appliances, and monitor and control their power usage, as the devices enter and leave the space. Each appliance is marked in such a way that the device can be sensed, recognized and controlled. In one embodiment, each power outlet 102 in a house is equipped with a layer that can sense, control and communicate with the appliances 104 plugged into the outlet 102, and connects physically or wirelessly to a platform node 54 of the present disclosure.

The platform node 54 of the present disclosure is used by first creating a sensor connection layer that interfaces with a sensor or sensors that detect the marking on the devices. In one embodiment, where the plug of each appliance 104 is marked with an RFID tag 106, the sensors used are RFID readers, and the sensor connection layer interfaces with the readers. In this embodiment, the sensor connection layer also interfaces with the power outlet 102, supporting the monitoring and modification of power usage. Then, a device driver for the RFID reader is created or taken from an existing library of drivers. The driver detects when an RFID tag 106 is present in the reader's sensing range (approx. 8 inch$^3$), and can provide the tag data and device location to other services or alert these services when an appliance 104 is removed. Communication between the appliance 104 and the middleware framework of the present disclosure, or between the platform node 54 and the middleware, occurs over any mechanism supported by the platform 54, such as wired Ethernet, WiFi, or Power Line Communication.

In one embodiment, the information contained within the RFID tag 106 on the appliance represents a device driver for the appliance, or a URL pointing to such a driver. The driver describes various properties of the device 104, and allows the space to integrate the device 104 automatically and to control the device using a software interface. This software interface can be used to provide an automatically updating interface for remote caregivers to control devices 104 in the space, or to allow smart space programmers to develop applications that monitor power usage and develop power saving algorithms that can run in the middleware or on the platform node of the current disclosure.

3) Geriatric Assessment Console

A Comprehensive Geriatric Assessment Console application monitors the Instrumental Activities of Daily Living of a resident and helps a professional caregiver make decisions regarding whether the resident is capable of continuing to live independently or requires additional human assistance. (M. P. Lawton and E. M. Brody, "Assessment of older people: self-maintaining and instrumental activities of daily living," *Gerontologist,* 9:179-186, 1969.)

Monitoring, an instrumental activity of daily living involves the use of many different sensors. For example, monitoring laundry activity may employ sensing the transfer of clothes to the laundry room with RFID, the use of the washing machine and dryer with contact sensors, and the retrieval of laundered clothes with RFID. Use of a platform node of the present disclosure in this application allows for the easy interface of heterogeneous sensors in a uniform fashion. In an exemplary embodiment, the Geriatric Assessment Console provides an IDE for a domain expert (such as a healthcare professional). The IDE provides a user with a view of all available sensor services in space, to allow the user to determine new activities that should be monitored for a particular resident. Building an IDE is straightforward using a platform node of the present disclosure because each sensor is already an independent service running in the framework.

4) Purdue NILE-PDT

The NILE-PDT (Phenomena Detection and Tracking) system was developed by the Indiana Database Center at Purdue University to detect and track environmental phenomena (gas clouds, oil spills, etc.). The node platform of the present disclosure, used with NILE-PDT, allows the system to sample data streams from many different sensors. Additionally, the platform node of the present disclosure allows a user to control the data streams by altering the sampling rate of the sensors using feedback algorithms, a mechanism that requires uniform interfacing with every sensor in the network.

In addition to providing a uniform interface to heterogeneous sensors, the platform node of the present disclosure also offers a plug-and-play development model, even for applications written outside the disclosed framework. A proxy system can be created to resolve issues such as the following conflicts: NILE-PDT uses UDP for communication and the platform node of the present disclosure uses TCP in its communication layer; moreover, the device drivers for the sensors of the platform node provide raw data readings, while NILE-PDT expects time-stamped data. These types of conflicts are expected to be common when the platform node of the present disclosure is used with existing third-party applications. The NILE-PDT developers were able to create a proxy in our framework that formed the bridge between the sensor services and the NILE-PDT engine. The disclosed middleware allows external applications to upload and register these proxy services into the framework.

All patents, patent applications, provisional applications, and publications referred to or cited herein are incorporated by reference in their entirety including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A system comprising:
a hardware platform, wherein the hardware platform is adapted to be communicably connected to an active object;
a middleware module, wherein at least a portion of the middleware module resides in and/or is executed on the hardware platform; and
at least one software service generated by the middleware module, wherein each of the at least one software service represents the active object,
wherein the active object is a device comprising a sensor and wherein the hardware platform is configured to receive raw data from the active object and pass the raw data to the middleware module, and the middleware module is configured to convert the raw data into useable data and pass the useable data to the at least one software service,
further comprising one or more applications written in a higher level language, wherein at least one of the one or more applications is configured to receive the useable data from one or more of the at least one software service,
wherein the hardware platform is adapted to be communicably connected to at least one additional active object,
wherein the middleware module generates at least one additional software service,
wherein each of the at least one additional software service represents one or more of the at least one additional active object and wherein each of the at least one additional active object is represented by one or more of the at least one additional software service,
wherein the at least one additional active object comprises one or more devices comprising an actuator,
wherein the middleware module is configured to:
receive commands from one or more applications written in a high level language via each of the at least one additional software service representing the one or more devices comprising an actuator;
convert the commands into low-level commands that can be understood by at least one of the one or more devices comprising an actuator; and
transmit the low-level commands to the at least one of the one or more devices comprising an actuator via the hardware platform, wherein the low-level commands are capable of controlling the at least one of the one or more devices comprising an actuator,
wherein the middleware module is configured to generate each of the at least one software service based on a driver, wherein the driver comprises information and behavioral components required to interact with the active object, and wherein the middleware module is configured to generate each additional software service of the at least one additional software service based on an additional driver, wherein the additional driver comprises information and behavioral components required to interact with one of the one or more of the at least one additional active object represented by the additional software service.

2. The system of claim 1, wherein the active object is a device comprising an actuator and wherein the middleware module is configured to:
receive commands from one or more applications written in a high level language via each of the at least one software service;
convert the commands into low-level commands that can be understood by the active object, and
transmit the low-level commands to the active object via the hardware platform, wherein the low-level commands are capable of controlling the active object.

3. The system of claim 1, wherein the at least one additional active object comprises one or more devices comprising a sensor,
wherein the hardware platform is configured to receive raw data from each object of the one or more devices comprising a sensor and pass the raw data to the middleware module, and the middleware module is configured to convert the raw data into useable data and pass the usable data to the one or more of the at least one additional software service that represents the object, wherein the useable data can be used by one or more applications written in a higher level language.

4. The system of claim 1, wherein the middleware module is configured to generate each of the at least one software service after the active object is communicably connected to the hardware platform.

5. The system of claim 1, wherein all of the at least one software service and the at least one additional software service comply with a standard, uniform interface.

6. The system of claim 1, wherein the active object and each of the at least one additional active object are located in a pervasive space.

7. The system of claim 6, further comprising the active object and each of the at least one additional active object.

8. The system of claim 1, wherein the hardware platform comprises a plurality of layered boards.

9. The system of claim 8, wherein the plurality of layered boards comprises a stack of layered boards, and a board may be added to or removed from the stack of layered boards.

10. The system of claim 1, wherein the hardware platform comprises an interface module, wherein the interface module is configured to communicably connect the active object and each of the at least one additional active object to the hardware platform.

11. The system of claim 10, wherein the interface module is configured to communicably connect one or more of the at least one additional active object to the hardware platform via a wireless connection.

12. The system of claim 11, wherein the interface module is configured to communicably connect one or more of the at least one additional active object to the hardware platform via a passively powered wireless connection.

13. The system of claim 1, wherein at least a portion of the middleware module resides in and/or is executed on a server connected to the hardware platform via a network.

14. The system of claim 13, wherein the hardware platform comprises a communication module, wherein the communication module is configured to communicably connect the hardware platform with the server via the network.

15. The system of claim 14, wherein the communication module is configured to communicably connect the hardware platform with the server via the network via a wireless connection.

16. The system of claim 14, wherein the communication module supports an Internet Protocol (IP), an ad-hoc networking protocol, a mesh networking protocol, or a combination of said protocols.

17. A method for providing a software service to represent an active object, comprising:
receiving a driver, wherein the driver comprises information and behavioral components required to interact with an active object communicably connected to a hardware platform, wherein the active object is selected from the group consisting of a device comprising a sensor, a device comprising an actuator, and a device comprising both a sensor and an actuator; and
generating based on the driver a software service to represent the active object, wherein when raw data from the active object is received by the hardware platform the raw data is converted into usable data and passed to the software service, wherein the useable data can be used by an application written in a higher level language, wherein the application is configured to receive the useable data from the software service,
wherein the software service is generated by a middleware module, wherein at least a portion of the middleware module resides in and/or is executed on the hardware platform,
further comprising:
receiving an additional driver, wherein the additional driver comprises information and behavioral components required to interact with an additional active object communicably connected to the hardware platform; and
generating based on the additional driver an additional software service to represent the additional active object,
wherein the additional active object is a device comprising a sensor, and wherein when raw data from the additional active object is received by the hardware platform the raw data is converted into usable data and passed to the additional software service, wherein the useable data can be used by a second application written in a higher level language, wherein the second application is configured to receive the useable data from the additional software service.

18. The method of claim 17, wherein at least a portion of the middleware module resides in and/or is executed on a server connected to the hardware platform via a network.

19. The method of claim 18, further comprising editing the software service.

20. The method of claim 19, wherein the editing the software service is performed remotely.

21. The method of claim 20, wherein the editing the software service comprises using an Integrated Development Environment (IDE).

22. The method of claim 18, further comprising:
decomposing a process into a first set of instructions to be performed by the hardware platform and a second set of instructions to be performed by the server; and
performing the process via the hardware platform and the server.

23. The method of claim 18, wherein the driver comprises configuration information from the hardware platform, wherein the configuration information comprises indicia of the hardware platform and/or indicia of an interface of the hardware platform to which the active object is communicably connected.

24. The method of claim 18, wherein the driver is stored on the hardware platform, the active object, the server, a local repository, or a remote repository.

25. The method of claim 24, wherein the driver is downloaded from the local repository or the remote repository by the middleware module based on resource location information received from the hardware platform or the active object.

26. The method of 25, wherein the resource location information comprises a Uniform Resource Locator (URL) for locating the driver via the Internet.

27. The method of claim 17, wherein the raw data is converted to usable data via the middleware module.

28. The method of claim 17, further comprising passing the useable data from the software service to the application.

29. The method of claim 17, further comprising filtering the raw data before converting the raw data into usable data; and/or filtering the usable data before passing the usable data to the software service.

30. The method of claim 29, wherein the filtering is performed by a processing agent on the hardware platform.

31. The method of claim 17, wherein the driver is received from the hardware platform.

32. The method of claim 17, further comprising generating a second software service, wherein the second software service represents the active object.

33. The method of claim 32, wherein the second software service is generated based on the driver.

34. The method of claim 33, wherein the active object is a device comprising both a sensor and an actuator,
wherein when one or more commands are received by the second software service the one or more commands are converted into one or more low-level commands capable of controlling the operation of the actuator and transmitted to the active object via the hardware platform.

35. The method of claim 17, wherein the additional active object is a device comprising an actuator, and wherein when one or more commands are received by the additional software service the one or more commands are converted into one or more low-level commands capable of controlling the operation of the actuator and transmitted to the additional active object via the hardware platform.

36. The method of claim 17, wherein the second application is the application.

37. The method of claim 17, further comprising providing information about the active object and the additional active object via a service registry.

38. The method of claim 37, wherein the software service and the additional software service are registered and hosted in a service framework.

39. The method of claim 38, wherein the service framework is based on either OSGi standard specifications or is a .net environment.

40. The method of claim 37, further comprising:
receiving an indication that the active object is no longer communicably connected to the hardware platform;
marking the software service as unavailable in the service registry; and
denying a request for data from the software service.

* * * * *

UNITED STATES PATENT AND TRADEMARK OFFICE
CERTIFICATE OF CORRECTION

PATENT NO.        : 7,895,257 B2
APPLICATION NO.   : 11/677372
DATED             : February 22, 2011
INVENTOR(S)       : Abdelsalam Helal et al.

It is certified that error appears in the above-identified patent and that said Letters Patent is hereby corrected as shown below:

Column 1,
Lines 14-16, "The subject invention was made with government support under a research project supported by a Department of Education Grant No. H133E010106." should read --The subject invention was made with government support under a research project supported by a Department of Education Grant No. H133E010106. The government has certain rights to this invention.--.

Column 1,
Line 27, "X10 (™)" should read --X10™--.

Column 5,
Lines 54-55, "interact with the" should read --interact with, the--.

Column 6,
Line 4, "P. Kliends" should read --P. Kriends--.
Line 52, "nay include" should read --may include--.

Column 7,
Line 37, "if actual the environment" should read --if the actual environment--.

Column 10,
Line 53, "DC (on a port" should read --ADC (on a port--.

Column 13,
Line 28, "by the OGSi Alliance" should read --by the OSGi Alliance--.
Line 31, "the net environment" should read --the .net environment--.

Column 20,
Line 66, "service the one or more" should read --service, the one or more--.

Signed and Sealed this
Seventeenth Day of May, 2011

David J. Kappos
*Director of the United States Patent and Trademark Office*